United States Patent [19]

Welschof Hans-Heinrich

[11] Patent Number: 4,487,593
[45] Date of Patent: Dec. 11, 1984

[54] BEARING ASSEMBLY

[75] Inventor: Welschof Hans-Heinrich, Rodenbach, Fed. Rep. of Germany

[73] Assignee: Lohr & Bromkamp GmbH

[21] Appl. No.: 317,608

[22] Filed: Nov. 3, 1981

[30] Foreign Application Priority Data

Nov. 6, 1980 [DE] Fed. Rep. of Germany ....... 3041855

[51] Int. Cl.$^3$ ............................................. F16D 3/20
[52] U.S. Cl. ................... 464/111; 464/178; 464/905
[58] Field of Search ............... 464/111, 123, 124, 178, 464/905; 308/191

[56] References Cited

U.S. PATENT DOCUMENTS

| 4,091,641 | 5/1978 | Welschof | 464/111 |
| 4,242,888 | 1/1981 | Komeiji et al. | 464/111 |

FOREIGN PATENT DOCUMENTS

| 2260413 | 6/1973 | Fed. Rep. of Germany | 308/191 |
| 2713085 | 10/1977 | Fed. Rep. of Germany | 308/191 |
| 2917243 | 10/1979 | Fed. Rep. of Germany | |
| 54-45442 | 4/1979 | Japan | 464/111 |
| 55-90723 | 7/1980 | Japan | 464/111 |

Primary Examiner—Stuart S. Levy
Assistant Examiner—Daniel P. Stodola
Attorney, Agent, or Firm—Toren, McGeady and Stanger

[57] ABSTRACT

A bearing assembly of a wheel hub for a motor vehicle wheel having an outer bearing ring adapted to be affixed with a vehicle chassis and an inner bearing ring having the wheel mounted thereon. A constant velocity joint is connected to the inner bearing ring for driving the wheel hub, the rotary joint including first and second joint members. The first joint member has three radially extending pins which are arranged uniformly spaced in the circumferential direction in a star-like configuration and are secured to the inner bearing ring. The second joint member is connected to a drive shaft and has three rolling tracks formed therein. The assembly further includes three annular rolling bodies having spherically shaped outer surfaces, each rolling body being separately supported on one of the pins and being received in the rolling tracks of the second joint member for the transmission of torque, the first bearing ring defining a bore for receiving the inner joint member.

2 Claims, 4 Drawing Figures

BEARING ASSEMBLY

BACKGROUND OF THE INVENTION

The present invention relates generally to a bearing assembly of a wheel hub for a motor vehicle and more particularly to an assembly wherein the wheel hub is driven by a rotary constant velocity joint and is provided at the respective wheel carrier of the motor vehicle.

More specifically, the invention relates to an assembly of the type wherein the outer bearing ring of the bearing assembly is designed so as to be affixed with the wheel chassis and wherein the inner bearing ring is connected to the wheel hub, on the one hand, and the rotary constant velocity joint, on the other. The rotary constant velocity joint includes a first joint member provided with three radially extending pins arranged uniformly spaced in the circumferential direction, annular rolling bodies each with spherically shaped outer surfaces supported separately on one of the pins, and a second joint member connected to a drive shaft and provided with three rolling tracks for receiving the rolling bodies.

In a bearing assembly of this type, known in the prior art from West German Offenlegungsschrift No. 29 17 243, provision is made for a wheel bearing where the rotary constant velocity joint is a so-called tripod joint. A joint of this type includes two members, the first of which has pins arranged in a star-like fashion and rolling bodies provided on the pins for the purpose of the transmission of torque. The second member is connected to the drive shaft. This bearing assembly has the disadvantage that it requires a large number of structural components for transmitting the torque from the drive shaft to the wheel hub. Additionally, splines must be provided for transmitting the torque from the star-shaped member to the wheel hub.

It is, therefore, an object of the invention to provide a wheel bearing assembly of the type which includes a tripod joint, has as small a number of structural components as possible, and meets all the requirements made of such an assembly, and wherein the joint is mounted so as to be detachable, so that the structural parts which are subject to wear can be replaced at any time.

SUMMARY OF THE INVENTION

Briefly, the present invention may be defined as a bearing assembly of a wheel hub for a motor vehicle wheel comprising an outer bearing ring adapted to be affixed with a vehicle chassis and an inner bearing ring having the wheel mounted thereon; rotary joint means connected to the inner bearing ring for driving the wheel hub, the rotary joint means including a first joint member and a second joint member, wherein the first joint member has three radially extending pins arranged uniformly spaced in circumferential direction in a star-like configuration and secured to the inner bearing ring and the second joint member is adapted to be connected to a drive shaft and has three rolling tracks formed therein; and three annular rolling bodies having spherically shaped outer surfaces, each rolling body being supported coaxially on one of the pins and being received in the rolling tracks of the second joint member, the inner bearing ring defining a bore for receiving the first joint member.

Thus, the objectives of the invention are achieved in that:

1. the pins of the first joint member are arranged in a star-like configuration in the bore of the inner bearing ring, and
2. the pins are secured to the inner bearing ring.

The advantages of a design such as that of the present invention arise in that provision has been made for a type of connection wherein the first member of the joint is directly connected to the inner bearing ring, so that a joint member can be omitted which would conventionally be required for the pins arranged in a star-like configuration. All that is required is a seal between the inner bearing ring and the drive shaft.

In accordance with another essential feature of the invention, the three pins form a single element and are connected to one another over a center piece located coaxially with the center axis of the inner bearing ring.

The advantage of such a design is that the pins have excellent stability, thereby ensuring the unimpaired performance of the pins.

In accordance with another significant feature of the invention, provision is made for the pins to be received in axially extending recesses of the inner bearing ring and for the pins to be axially secured by appropriate securing means. This permits a simple and uncomplicated mounting of the joint in the inner bearing ring of the bearing assembly.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
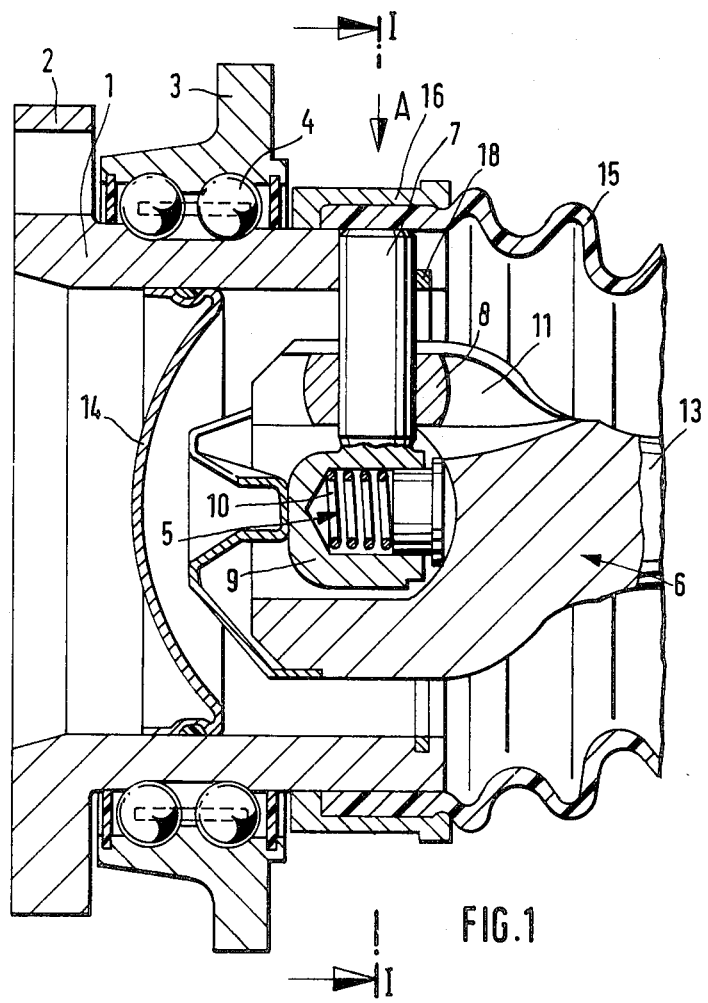
FIG. 1 is a sectional view of a wheel bearing assembly with a driving joint.

In accordance with the present invention, a wheel bearing for a motor vehicle is illustrated in FIG. 1 which includes an inner bearing ring 1 provided with a wheel hub 2. On the inner bearing ring 1 and on an outer bearing ring 3, races for balls 4 are arranged in such a way that a double-row angular contact ball bearing is produced. The outer bearing ring 3 is adapted to be affixed to a vehicle chassis. The wheel hub 2 serves for mounting a brake disk and the wheel, not illustrated.

The assembly also includes a rotary constant velocity joint with a first joint member 5 and a second joint member 6, wherein the first joint member 5, as illustrated in the drawing, has three radially extending pins 7 arranged uniformly spaced in circumferential direction and supporting annular rolling bodies 8 having spherically shaped outer surfaces. Each rolling body 8 is supported separately on a pin 7 so as to be radially movable in the direction of the axis of the pin 7. The pins 7 are connected to one another over a center piece 9. In its interior, the center piece 9 has a spring 10 which is required for compensating any play. The second joint member 6 is formed with webs 12 which are provided with rolling tracks 11 each of which, seen in axial direction, has a radius of curvature which corresponds to the spherical shape of the outer surface of the rolling bodies 8. At the end facing away from the wheel hub, the webs 12 containing the rolling tracks are joined together and are connected to the drive shaft 13.

For sealing the joint within the inner bearing ring 1, a sealing cap 14 is provided on one side and a bellows 15 is provided on the other, the bellows 15 being connected to the outer surface of the inner bearing ring 1 by appropriate fastening means 16.

Figure 2:
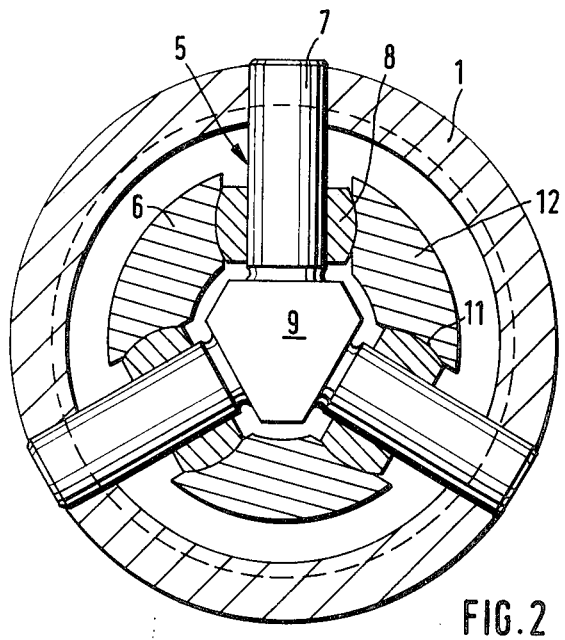
FIG. 2 is a sectional view of the wheel bearing assembly as illustrated in FIG. 1, taken transversely along sectional line I—I of FIG. 1.

FIG. 2 is a sectional view taken along sectional line I—I of FIG. 1, essentially illustrating the inner bearing ring 1 and the pins 7 connected to the center piece 9. The webs 12 containing the rolling tracks 11 form part of the second joint member 6.

Figure 3:
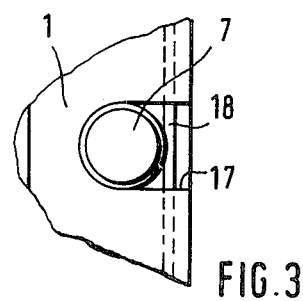
FIG. 3 is a partial view illustrating the positioning of a pin in the inner bearing ring.

FIG. 3 is a partial view of the inner bearing ring 1 illustrating a possibility of fixing, in a simple manner, the pins 7 to the inner bearing ring 1, wherein axially extending recesses 17 provided in annular end face of the inner bearing ring 1 receive the pins 7 and a securing ring 18 ensures the connection in axial direction. The pins 7 may also be secured relative to the inner bearing ring 1 by means of snap rings or by grooved or welded connections.

Figure 4:
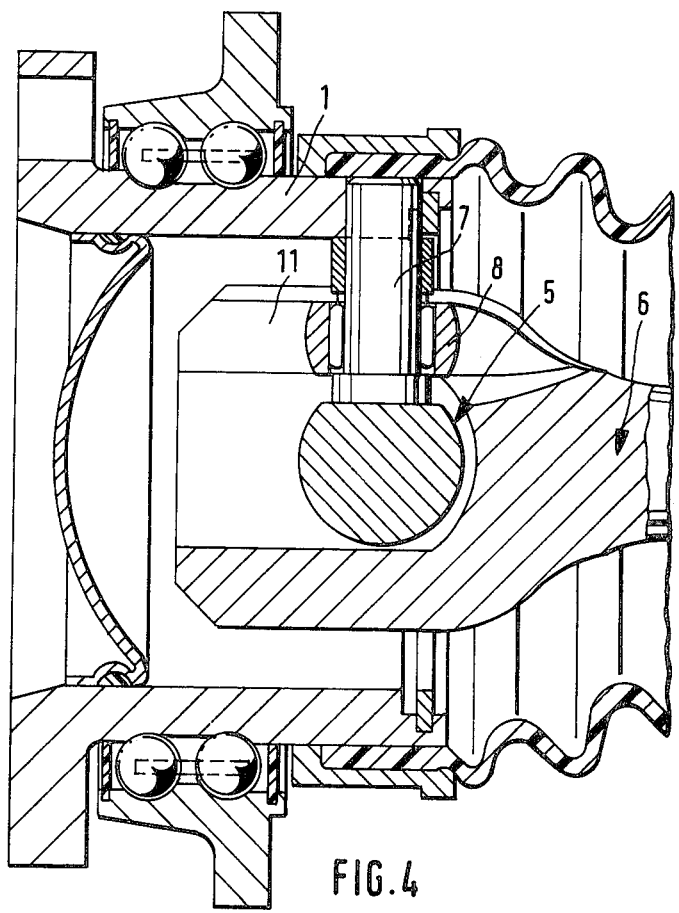
FIG. 4 is a sectional view of a wheel bearing assembly illustrated, in principle, as in FIG. 1 but with a sliding constant velocity joint.

The wheel bearing assembly shown in FIG. 4 is essentially the same as that illustrated in FIG. 1, the difference residing in the fact that the second joint member 6 is supported so as to be movable relative to the inner bearing ring 1. The pins 7 of the first joint member 5 are attached to the inner bearing ring 6. The movement of the first joint member 5 relative to the second joint member 6 is effected by a rolling movement of the rolling bodies 8 in the rolling tracks 11 of the second joint member 6. A wheel bearing assembly of this type with a sliding joint can be used, for example, in connection with a rear axle drive of a motor vehicle with independent wheel suspension.

While specific embodiments of the invention have been shown and described in detail to illustrate the application of the inventive principles, it will be understood that the invention may be embodied otherwise without departing from such principles.

I claim:

1. A bearing assembly of a wheel hub for a motor vehicle wheel, comprising an outer bearing ring adapted to be affixed with a vehicle chassis; an inner bearing ring having first and second ends, said first end adapted to be connected to said wheel and said second end forming an annular end face, said inner bearing ring having an axis of rotation; said outer bearing ring concentrically surrounding said inner bearing ring so that said inner bearing ring rotates within and is guided by said outer bearing ring; rotary joint means connected to said inner bearing ring for driving the wheel hub, said rotary joint means including a first joint member and a second joint member, said first joint member having three pins extending radially relative to said axis of rotation and uniformly spaced in a star-like configuration in the circumferential direction of said joint means and secured to said first joint member; said inner bearing ring defining recesses in said end face and extending in the direction of said axis of rotation for receiving said pins and including removable securing means for axially securing said pins in said recesses; said second joint member being adapted to be connected to a drive shaft and having three rolling tracks formed therein; and three annular rolling bodies having spherically shaped outer surfaces; each said rolling body being separately supported on one of said pins and being received in said rolling tracks of said second joint member, said inner bearing ring defining a bore for receiving said first joint member.

2. A bearing assembly in accordance with claim 1, wherein said first joint member includes a center piece located coaxially with the center axis of said inner bearing ring, said pins being affixed to said center piece so that said center piece and said pins form a single unit.

* * * * *